Patented Aug. 18, 1953

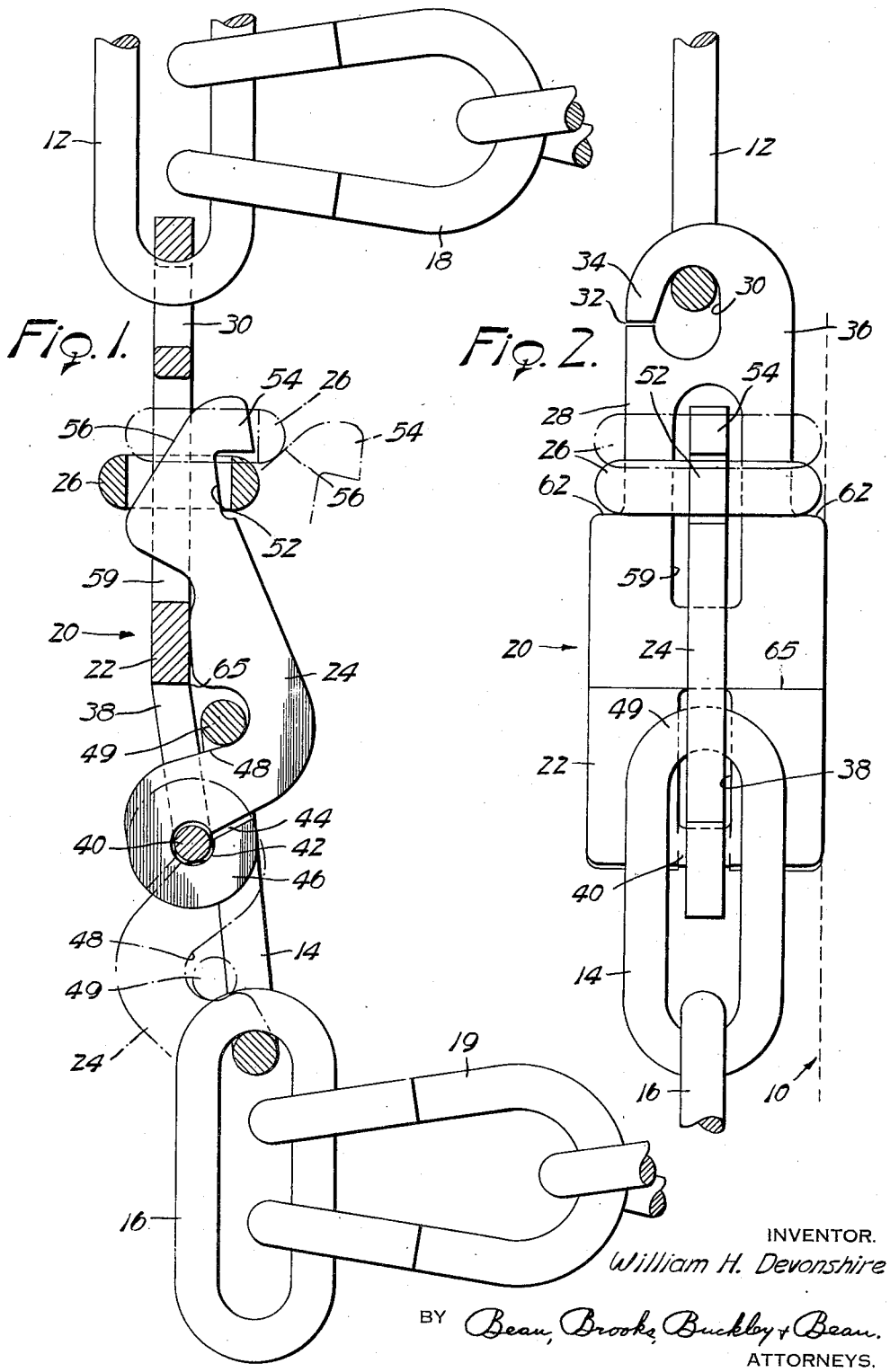

2,648,881

UNITED STATES PATENT OFFICE 2,648,881

TIRE CHAIN FASTENER

William H. Devonshire, Williamsville, N. Y., assignor to Columbus McKinnon Chain Corporation, Tonawanda, N. Y.

Application June 11, 1948, Serial No. 32,442

2 Claims. (Cl. 24—69)

This invention relates to improvements in vehicle tire chain connectors or fasteners such as are usually operable in connection with tire chain mounting and dismounting operations.

One of the objects of the invention is to provide an improved fastener of the character referred to, comprising a body member adapted to be permanently linked to one end of a chain strand, and a lever member pivotally mounted upon the body member for hooking engagement with the other end of said chain strand, and a keeper link slidable upon the body member for detachably holding the lever member in its engaged position.

Another object of the invention is to provide in a chain fastener of the character described a body member of improved form which is adapted to be inexpensively manufactured.

Another object of the invention is to provide in a chain fastener of the character described an improved form of lever member.

Another object of the invention is to provide in a chain fastener of the character described, in combination, an improved body member and an improved lever member and a lever keeper link, whereby to facilitate mounting manipulation of the operative parts during chain coupling operations.

Another object of the invention is to provide an improved chain coupling mechanism which is particularly suited to be employed, for example, for vehicle tire chain fastening purposes, whereby the operation of mounting and hooking up a traction chain upon a vehicle wheel tire is greatly facilitated and may be performed with greater ease under typical service conditions.

Other objects and advantages of the invention will appear from the specification hereinafter.

In the drawing:

Fig. 1 is a fragmentary side elevational view of a vehicle tire chain side strand incorporating a fastener device of the invention; the fastener device being longitudinally sectioned in the illustration; and Fig. 2 is a top plan view of the fastener device of Fig. 1.

The drawing illustrates the invention in conjunction with a traction chain strand indicated fragmentarily as being mounted upon a vehicle tire so as to lie alongside a side wall portion of the tire designated 10 (Fig. 2). Thus, it will be appreciated that Fig. 2 provides a fragmentary edgewise view of the vehicle tire and a fragmentary plan view of one of the pair of side chain strands such as are conventionally provided to lie alongside opposite side walls of the vehicle tire. In the drawing the illustrated side chain strand includes an end link 12 and opposite end links 14—16. As is customary, the opposite side chain strands are interconnected at intervals peripherally of the tire by a series of cross chains which are fragmentarily illustrated in Fig. 1 at 18—19.

A fastener device of the invention is indicated generally at 20 as being arranged to detachably interconnect the side chain links 12—14. Thus it will be appreciated that each of the side chain strands at opposite sides of the vehicle tire will be discontinuous and arranged to be detachably connected at their ends by a fastener device as is illustrated at 20 in the drawing, although the drawing shows only one such side chain strand and its fastener for the purpose of simplifying the drawing.

The fastener device comprises a body member 22, a latch lever 24, and a lever keeper link 26. The body member 22 comprises a metal plate of generally rectangular form which is of such shape as to be readily adapted to be manufactured by simply stamping it out of sheet metal stock in a single stamping operation. The body member 22 is formed with a reduced width portion 28 at one end, and is perforated as indicated at 30 so as to receive the end of the side chain link 12 in permanently connected relation. To facilitate assembly of the fastener device upon the chain link 12 the body plate portion 28 may be conveniently severed as indicated at 32 from one edge thereof into the opening 30, as a part of the operation of stamping out the body member from the metal stock piece. Then, the end hook portion 34 of the body member may be simply twisted relative to the rest of the body portion to a degree sufficient to permit the link 12 to be hooked into the recess 30, whereupon the hook end 34 is twisted back into the plane of the body portion so as to lock one end of the side chain into connection with the fastener body member. To provide optimum strength-to-metal ratio in the hook connection between the link 12 and the body plate so as to avoid necessity for subsequently closing the cut 32 by welding or the like, the recess 30 is positionally offset from the center line of the body member so as to provide the base of the hook portion of increased thickness as indicated at 36 (Fig. 2) so as to successfully resist the leverage loads thereon.

The body member 22 is also perforated at its other end as indicated at 38, and the opening 38 is so positioned lengthwise of the body member as to leave an arbor portion 40 extending across the end of the body member upon which the lever 24 is pivotally mounted. The lever 24 is also so designed as to be adapted to be easily fabricated by simply stamping it from metal plate stock. Thus the lever piece is stamped to include a circular aperture 42 (Fig. 1) which is adapted to loosely fit about the trunnion portion 40 of the body plate; and the lever stamping operation may also include provision of a cut leading from an edge of the lever piece into the opening 42. The cut is made wide enough to permit the lever 24 to be slip-fitted upon the arbor 40, and then the lever part 46 is squeezed inwardly so as to close the cut as into the condition indicated at 44 (Fig. 1).

The lever 24 includes a recess 48 (Fig. 1) at the inner side thereof which is adapted to receive in hooked relation thereon the free end of the chain link 14. Thus, preliminary to a chain coupling operation the lever may be opened to the broken line position thereof in Fig. 1 so that the free end 49 of the chain link 14 may be hooked into the recess 48 of the lever. The free end of the chain will thereupon hang naturally in hooked relation but somewhat slack upon the fastener device 20. This facilitates initial arrangement of the traction chain about the vehicle tire, because the lever recess 48 is conveniently disposed for ready access and hooking connection with the free end of the side chain strand while the operator is arranging the traction chain about the tire. After both of the side chains have thus been hooked upon the respective fastener devices the entire assembly may be brought into snug fitting relation upon the tire by forcing the levers to pivot upon their arbors so as to pull the ends 49 of the links 14 from the broken line positions into the solid line positions thereof as illustrated in Fig. 1.

At its free end the lever 24 is shaped with a notch portion 52 thereby defining a hook nose 54 which is adapted to engage behind the keeper link 26 as illustrated by the solid line showings thereof in Fig. 1. The free end of the lever is tapered so as to provide a sloping cam surface 56 which bears down against the keeper link 26 as shown in the broken line illustrations thereof whenever the keeper link tends to interfere with closing of the lever into the solid line position thereof as shown in Fig. 1. This prevents jamming of the lever by the keeper link, thereby insuring smooth operation of the lever and avoiding unnecessary interferences of the parts such as would otherwise impair the smoothness of operation and increase the difficulties attendant assembly of the traction chain upon the tire. To accommodate free movement of the cam portion 56 of the lever into final locked position relative to the body plate the latter is perforated as indicated at 59.

The main body portion of the member 22 is formed to such width dimension in plan view as seen in Fig. 2 that when the lever 24 is hooked into the chain link 14 and the entire assembly is in operative position upon a tire the inner edge of the body member 22 will bear against the adjacent side wall portion of the tire, thereby holding off the reduced width portion 28 of the body plate and permitting free sliding movement of the keeper link 26 thereon. The juncture between the main body portion 22 and the reduced width body portion 28 of the body plate is defined by the shoulders 62—62, and it is a particular feature of the invention that the shoulders 62 are longitudinally positioned on the body plate so as to function effectively as stops limiting rearward movements of the keeper link 26 within the range of the cam surface 56 on the lever. Hence, when the lever is being pressed "home" toward locking position it is not necessary to pay attention to the position of the keeper link 26, because the cam surface of the lever will shove it forwardly out of interfering position as the lever closes. Then the attendant merely slides the keeper back into locking position behind the lever hook nose 54, thereby latching the lever in closed position. The body portion between the openings 38—59 therein functions as a stop to properly position the lever when it is closed and ready to receive the keeper link.

As shown in Fig. 1, the body plate is preferably bent as along the line 65 so as to offset the arbor end of the plate from the main plane thereof. This brings the lever pivot axis more nearly into line with the direction of pull of the chain through the fastener device, thereby reducing the loads upon the lever and the keeper device. The opening 38 is preferably dimensioned so as to fairly snugly fit the lever 24 whereby to reduce as much as possible any tendency of the lever to "wobble," while the opening 59 is preferably much wider than the lever so as to freely accommodate the lever even though it does "wobble" to some degree upon the arbor 40.

Thus, it will be appreciated that the entire body plate fabrication may be easily and inexpensively performed by simple stamping out of metal plate stock with a suitable die so as to simultaneously form the outer contour of the plate and the apertures 30—38—59 and the cut 32, while simultaneously bending the plate along the line 65; and that the lever member may similarly be inexpensively manufactured and assembled thereon. It will also be appreciated that the mechanism is then adapted to be used with improved facility and convenience under typical highway installation and dismounting conditions.

I claim:

1. A tire chain fastener including an elongated body member comprising a metal plate of generally rectangular form, said body member having an eye portion at one end for permanent connection with one end link of a tire chain strand when disposed alongside a tire wall, a latch lever pivotally mounted upon said body member adjacent the other end thereof, said lever being adapted to be hooked into a link at the opposite end of said tire chain strand and then pivotally closed relative to said body member, whereby to interconnect the opposite ends of said chain strand, said lever being formed at its free end at one side thereof with a hook portion, said body member having a reduced width end portion providing a longitudinally extending inwardly offset side edge portion at the side edge thereof that engages the tire when assembled thereon, with a shoulder at the inner end thereof, said inwardly offset side edge portion extending in the region of the hooked end portion of said lever when the lever is disposed alongside the body member, and a lever keeper link slidably embracing said reduced end portion and freely slidable therealong into and out of engagement with the hooked end portion of the lever, said keeper link having a side wall portion extending around said inwardly offset side edge portion of the reduced end portion of a thickness less than the distance between the inwardly offset side edge portion and the plane of the adjacent side edge of the body member so that said side wall of the keeper link is disposed inwardly of the plane of said side edge of the body member that engages the tire and is freely slidable without interference by rubbing against the tire side wall, the rearward sliding movement of the keeper link on the reduced end portion of the body member being limited by said shoulder on the body member.

2. A tire chain fastener of the construction set forth in claim 1 and in which the latch lever is formed at its free end at the underside thereof opposite the side at which the hook portion of the lever is located with a cam surface inclined forwardly and inwardly toward the outer end of the lever, said cam surface being adapted when the lever is moved inwardly alongside the body member to engage and force said keeper link forwardly out of interference with the inward movement of the lever when the keeper link is in the path of closing movement of the lever.

WILLIAM H. DEVONSHIRE.

References Cited in the file of this patent

UNITED STATES PATENTS

| Number | Name | Date |
|---|---|---|
| 1,420,949 | Schindler | June 27, 1922 |
| 1,643,043 | Willis | Sept. 20, 1927 |
| 1,792,336 | Trippensee | Feb. 10, 1931 |
| 1,860,695 | Stahl et al. | May 31, 1932 |
| 2,123,865 | Stahl | July 12, 1938 |
| 2,153,002 | Reyburn | Apr. 4, 1939 |
| 2,153,003 | Myers et al. | Apr. 4, 1939 |
| 2,444,513 | Kostelny | July 6, 1948 |

FOREIGN PATENTS

| Number | Country | Date |
|---|---|---|
| 49,105 | France | July 26, 1938 |

(Addition to No. 820,171)